Sept. 1, 1959            J. L. COLTEN            2,902,627
SEISMOGRAPH SHOT FIRING DEVICE
Filed March 30, 1955
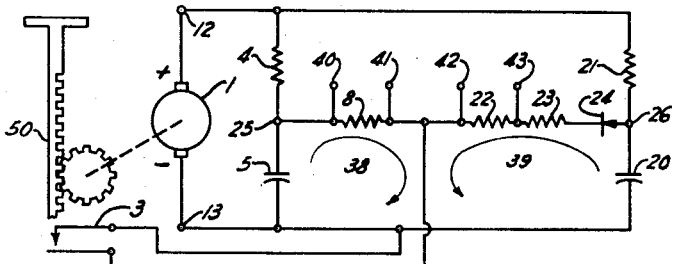
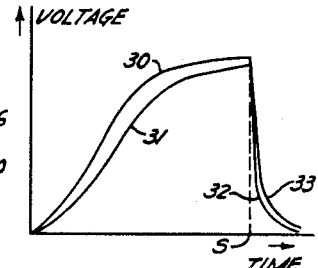
*Fig. 1*       *Fig. 2*
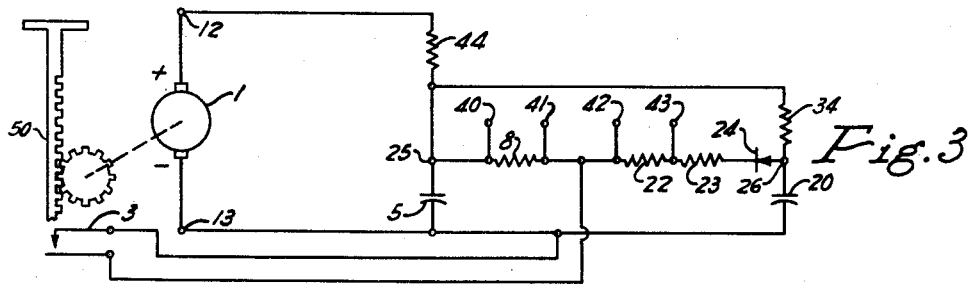
*Fig. 3*
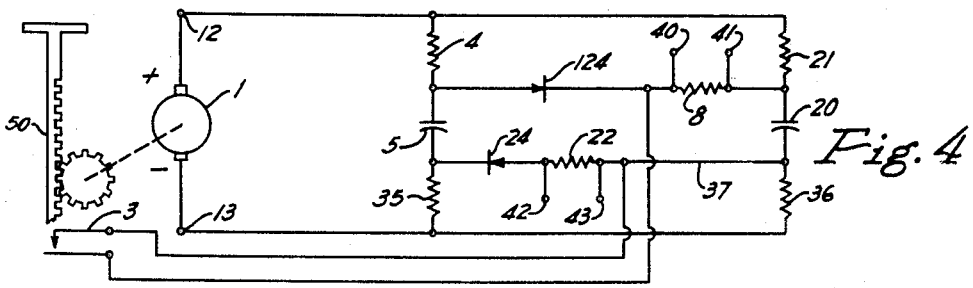
*Fig. 4*
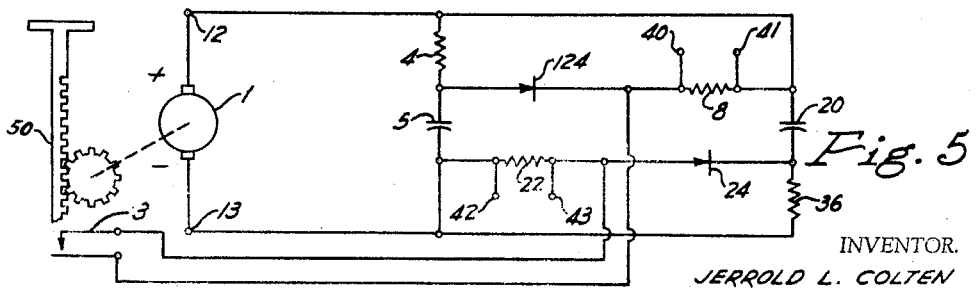
*Fig. 5*
INVENTOR.
JERROLD L. COLTEN
BY
*Horace Brooks*
ATTORNEY

2,902,627

SEISMOGRAPH SHOT FIRING DEVICE

Jerrold L. Colten, Oakmont, Pa., assignor to Gulf Research & Development Company, Pittsburgh, Pa., a corporation of Delaware Application March 30, 1955, Serial No. 497,887

11 Claims. (Cl. 317—80)

This invention concerns an apparatus for firing electric detonators which is particularly useful in seismograph prospecting operations in that the apparatus provides means for obtaining an accurate recording of the instant at which the explosive detonates.

In seismograph geophysical-prospecting operations it is customary to fire one or more explosive charges usually but not necessarily buried in the earth, and to record distant earth tremors resulting from the explosion. A study is made of the travel times of the tremors and from an analysis of such travel times geophysicists may in known manner deduce the structure of the underlying rock formations. In order to measure the travel time of the various tremors or seismic disturbances produced by the dynamite explosion, it is necessary to record along with the seismograph tremors the instant at which the shock or tremor is initiated, namely, the instant at which the tremor-producing explosion occurred. The instant is ordinarily termed the "shot moment." The associated circuit is often termed a "timing circuit."

In the patent to Muffly No. 2,623,922, issued December 30, 1952, there is shown an electric shot-firing device whose circuit components are arranged to develop a shot-moment pulse which is easily recognizable on a recording. However, certain limitations of this device have been observed, particularly when it is desired to transmit the shot moment to a distant recording point by radio. The Muffly device results in an excellent recorded shot-moment pulse when the signal can be transmitted directly to a recording galvanometer over wires. The pulse transmitted by the Muffly device is of very short duration and the galvanometer deflection is substantially a ballistic kick. When the shot moment must be sent by radio or over long transmission lines including coupling transformers, it has been found that the recorded pulse may be severely attenuated due to the very high frequency spectrum of the short pulse produced. For efficient radio transmission of the fractional-millisecond pulse produced by the Muffly device, it is necessary for the audio channels involved to have a high degree of fidelity not usually found in ordinary field equipment. In addition, certain types of recorders use incandescent lamps instead of galvanometers to produce a variable-density recording, and in these cases it was found that the Muffly pulse was so short as to contain insufficient energy to actuate the recording lamps. Various obvious expedients, such as amplification and high-pass filtering, have been found to be of no avail since they also accentuate high-frequency circuit noise and do not improve the shot moment signal-to-noise ratio.

This invention is an improvement on the Muffly device in that it provides a second circuit for obtaining the shot moment. This circuit is distinct from the firing circuit and is attached thereto in that the two circuits have a common charging generator and in that they both discharge through the same switch. This prevents the shot-moment circuit and the resulting shot-moment signal from being affected by unavoidable variations in the detonator-circuit impedance. In addition, it permits adjustment of the shot-moment circuit constants independently of the firing-circuit constants. Both the shot-moment circuit and the detonator circuit are closed through a common switch which insures simultaneous actuation of both circuits.

Accordingly, it is an object of this invention to provide an apparatus for firing a seismograph shot which provides an accurate signal of the instant of detonation of the explosive.

It is another object of this invention to provide a seismograph shot-firing device which provides an accurate signal of the shot moment and permits the characteristics of this signal to be adjusted independently of the firing circuit.

It is a further object of this invention to provide a seismograph shot-firing device which provides safe means of firing a seismograph shot and provides a signal of the shot moment which is accurate and which signal contains a large amount of energy.

These and other objects of this invention are attained by the apparatus described in this specification of which the drawings form a part and in which:

Figure 1 shows a schematic wiring diagram of the circuit employed in a preferred embodiment of this invention;

Figure 2 shows oscillograms of the current through two parts of the circuit of this invention;

Figure 3 shows a schematic wiring diagram of a modified embodiment of the invention;

Figure 4 shows a schematic wiring diagram of still another embodiment of the invention; and Figure 5 shows a schematic wiring diagram of still another embodiment of the invention.

In the wiring diagrams, like numerals refer to circuit elements having like functions in each of the several figures.

In this invention a hand-driven generator charges two condenser circuits, which at the end of the generator stroke are both discharged by means of a common switch which initiates discharge of one condenser through the detonator to fire the same, and which simultaneously initiates discharge of the other condenser through the shot-moment circuit developing thereby a characteristic pulse indicative of the shot moment.

Referring to Figure 1, the numeral 1 indicates a hand-driven generator of the type generally employed in blasting machines. The generator is arranged in well-known manner to develop across its terminals 12 and 13 a D.-C. voltage of substantial magnitude at the completion of the stroke of the machine. The generator terminals 12 and 13 are connected to two condensers 5 and 20 through resistors 4 and 21 respectively as shown in Figure 1. The points intermediate between each series resistor and condenser, namely, points 25 and 26, are connected together through resistors 8, 22, 23, and rectifier 24. A normally-open single-pole switch 3 is connected between the junction of resistors 8 and 22, and the terminal 13 of the generator which connects directly to the condensers 5 and 20. The switch 3 is initially open, and the rack and gear mechanism 50 customarily employed for driving the generator is adapted to mechanically automatically close the switch 3 near the end of the generator driving stroke at which time the generator has built up to substantially its full voltage. During the build-up of the generator voltage the conndensers 5 and 20 become charged through their respective resistors 4 and 21. The voltage developed across the condensers is shown by the oscillograms of Figure 2 wherein the curve 30 is the voltage across condenser 5 and curve 31 is the voltage across condenser 20, both being plotted as a function of time. Terminals 40 and 41, connected across the resistor 8, are connected to the detonator to be fired, and terminals 42 and 43, connected across the element 22, are connected to whatever electrical signalling apparatus is used to transmit the shot-moment signal to the recording apparatus.

Upon closure of switch 3 the firing condenser 5 discharges through the parallel circuit comprising resistor 8 and the detonator connected to terminals 40 and 41. Also upon closure of switch 3, the timing condenser 20 discharges through resistors 22, 23, and rectifier 24. The element 22 with terminals 42 and 43 is indicated in Figure 1 as a resistor by way of example only. Element 22 may be replaced by any timing circuit means and may comprise a transformer primary or a galvanometer or generally may be a shot-moment signalling circuit of any known type. Resistor 23 may be made adjustable and it is desirable from a safety standpoint that resistor 23 be made to exceed a minimum value to avoid the possibility of stray voltage from the shot-moment circuit from establishing any current of firing strength in the detonator. Resistor 23 also functions to limit the peak discharge current of condenser 20 and at the same time functions to increase the discharge time. The first function insures against burning out variable-density recording lamps and the second function insures that the discharge time will be long enough so that the lamps will respond to the shot-moment signal. The manner of connecting rectifier 24 will be explained later, and under certain circumstances rectifier 24 may be omitted as explained later.

The two circuits comprising respectively condenser 5 and its charging resistor 4, and condenser 20 and its charging resistor 21, may be considered separately. The resistances and condensers in the two charging circuits 4, 5 and 21, 20 can be made to have identical time constants, whereupon junctions 25 and 26 will rise equally in potential so that no stray current or generator ripple will tend to pass through either the detonator or the timing circuit before switch 3 is closed. Under these circumstances rectifier 24 may be omitted. However, this balance is not easily made or perfectly maintained in the field. Therefore the timing-branch (20, 21) time constant is preferably made longer, so that junction 25 is at a higher potential during the charging period, and in order to prevent flow of current between junctions 25 and 26 prior to closing of switch 3 the rectifier 24 is inserted as shown in Figure 1 with the direction indicated.

Figure 2 shows the voltages across the two condensers 5 and 20 as a function of time. Condenser 5 charges faster along curve 30, and condenser 20 charges more slowly along curve 31, as determined by the above-mentioned difference in time constants. Condenser 5 is always at the higher voltage during charge. Rectifier 24 is connected in such a direction with regard to the source polarity so that it will oppose current flow due to the difference of condenser voltages during the charging period, and this also puts it in the proper direction to carry the timing pulse which discharges from condenser 20 when switch 3 closes. Preferably the charging time constant for the shot-moment circuit (21, 20) is about 50 to 100 percent higher than that for the firing circuit (4, 5), or at least enough higher to take care of any ordinary variations that may occur in the resistor and capacitor values. Rectifier 24 as shown in Figure 1 is in the proper direction for the polarity shown on terminals 12 and 13 of Figure 1 and for the circuit 20, 21 having a longer time constant of charge than the circuit 5, 4.

By way of example, circuit values which have been found to be useful in Figure 1 are:

Generator 1 _____ 50 cap blasting machine.
Condenser 5 _____ 60 mfd.
Resistor 4 _____ 600 ohms.
Resistor 8 _____ 20 ohms.
Condenser 20 _____ 2 mfd.
Resistor 21 _____ 33,000 ohms.
Resistor 23 _____ 1,000 ohms.
Rectifier 24 _____ 1N93 germanium diode.
Timing circuit
 impedance (22) _____ 500 ohms.

As shown in Figure 2, the total charging time may be of the order of a few tenths of a second for a push-down type of blasting machine. The instant of closing switch 3 is at point marked S in Figure 2. The discharge time, greatly exaggerated in the figure, is about one millisecond for the detonator circuit, as illustrated to the right of point S by curve 32. The discharge time for the shot-moment circuit may be longer, if desired, and is shown by the curve 33. Curve 33 may be lengthened or shortened in time by increasing or decreasing the value of resistor 23 to suit the type of shot-moment transmission channel and recording device employed.

It is essential to this invention that the peak voltage across condenser 5 be sufficiently high that the peak current delivered to the detonator connected to terminals 40 and 41 will be greater than the so-called critical current for the detonator. Most commercially-available detonators now being made for geophysical seismograph operations are so designed that when a suddenly-applied current exceeds a known value, called the critical current, the detonator fires within a fraction of a millisecond. This is sufficiently accurate for most seismograph-prospecting operations. If the applied current is less than the critical current, there may be a delay of more than a millisecond between the application of the current and the detonation of the cap. This invention depends for successful operation on the application to the detonator of more than the known critical current for the type of detonator with which the invention is used.

As shown in Figures 1 and 2, upon operating the generator 1, voltage gradually builds up on condensers 5 and 20, and upon reaching the end of the generator stroke the switch 3 is automatically closed and both condensers begin to discharge (point S of Figure 2). Condenser 5 discharges around the loop indicated in Figure 1 by the arrow 38 and this loop includes the detonator connected to terminals 40 and 41. Condenser 20 discharges around the loop indicated in Figure 1 by the arrow 39 and this loop includes the timing circuit connected to terminals 42 and 43. Inasmuch as the detonator fires within one millisecond of the time S, the signal transmitted to the timing circuit by the sudden flow of current around the loop 39 will indicate the shot moment to within one millisecond.

Whereas Figure 1 shows a preferred embodiment of this invention, other embodiments are shown in Figures 3, 4, and 5. Figure 3 shows a diagram of an embodiment of the invention which insures that condenser 20 will never charge faster than condenser 5. In Figure 3 both condensers 5 and 20 must charge through resistor 44 but condenser 20 has the additional resistor 34 in series with it so that condenser 20 will charge more slowly than condenser 5. Otherwise the circuit on Figure 3 contains all of the features of that of Figure 1. As in Figure 1, the rectifier 24 of Figure 3 is connected in such a direction that no current is permitted to flow from junction 25 to junction 26.

Figure 4 shows a diagram of an embodiment of the invention in which a series charging resistor is placed at each end of each condenser. The detonator is connected to terminals 40 and 41 across the resistor 8 and the timing circuit is connected to terminals 42 and 43 across the element 22. The rectifiers 24 and 124 may be omitted from Figure 4 if the impedance of the capacitors 5, 20 and that of the respective charging resistors are made proportional. Thus, if impedance 4/impedance 21=impedance 5/impedance 20=impedance 35/impedance 36, then the potential at the corresponding condenser terminals will rise together along the same charging curve. With this condition there will be no flow of current in the horizontal branches of Figure 4 during the charging interval and accordingly the rectifiers may be omitted if the above condition prevails.

However, whenever the circuit arrangement is such that the potentials on the condensers rise at different rates on the terminals of the two condensers, then diode rectifiers 24 and 124 are added as shown in Figure 4, the direction of the rectifier being as shown for generator polarity shown in Figure 4 and for the circuit (in this figure) 21, 20, 36 having a shorter time constant of charge than circuit 4, 5, 35. Depending on the particular circuit arrangement the location and number of rectifiers may vary but may readily be determined as follows:

Whenever the above-mentioned proportionality of impedances does not prevail, there will be a tendency for some of the charging current to find its way across the circuit through one of the branches that are drawn horizontal in the figures. The rectifier must therefore be placed somewhere in any such branch if it contains a timing circuit or detonator that may be affected by the charging current. Each of these horizontal branches, however, is divided into two legs, one on either side of the firing-switch connection. Discharge currents flow to the firing switch from both condensers and hence in opposite directions in these two legs. The rectifier must pass one of these discharge currents in addition to opposing flow of stray (horizontal) charging current. Therefore the rectifiers must always be put in the leg in which charge and discharge currents flow in opposite directions. In Figure 4, for example, charging current flows downwardly through the vertical branches of the circuit (as it does in all the circuit diagrams). Since the right branch has the shorter time constant, condenser 20 charges faster and causes some charging current to try to follow a path through 21, 8, 124, 5, 24, 22, 37, and 36 in series. Discharge currents follow a clockwise path in a discharge loop through 124, 3, and 22, and counterclockwise in a loop through 8, 3, and conductor 37. Thus charge and discharge currents are in opposition only in the legs which consequently contain the diodes 24 and 124. Diodes in the other legs of the discharge loops would be improper as they could not pass the discharge current while blocking stray charging current, since both the currents flow in the same direction in these legs.

In Figure 5 two of the charging resistors have been eliminated as compared to Figure 4. The detonator is connected to terminals 40 and 41 across the resistor 8 and the timing circuit is connected to terminals 42 and 43 across the element 22. The charging time constant of circuit 20, 36 is shorter than that of circuit 4, 5. This requires rectifier 24 to be reversed (as compared with Figure 4) and moved to a different leg to satisfy the above requirements because of reversal of direction of the stray-charging-current in the lower horizontal branch of the circuit through 22, 24.

Whereas simple single resistors have been shown in the charging circuits of the firing capacitor and the timing capacitor, it is understood that these may be made of a plurality of resistors to achieve a desired resistance value, and either of the charging circuits may comprise a network of resistors. Furthermore some of the resistors may take part in both networks, as for example in Figure 3 wherein the resistor 44 forms part of the charging network of the condenser 20, as well as constituting the charging network of the condenser 5. It is also contemplated that the firing-condenser-charging circuit resistance may be comprised only of the internal resistance of the components involved without the use of additional resistors and furthermore may contain appropriate switches for safety or other purposes or automatic switching means for the purpose of charging a group of firing condensers in parallel and subsequently connecting them in series for discharge as is well known in the art.

What I claim as my invention is:

1. Apparatus for firing an electric detonator and simultaneously transmitting an electrical timing impulse comprising a direct-current source, a firing capacitor, a timing capacitor, means for connecting said firing capacitor to said source, a resistance network through which said timing capacitor is connected to said source, a normally-open single-pole switch, connections comprising two discharge loops connected to said capacitors and having in common said single-pole switch, means to prevent charging current from flowing in said discharge loops, means for connecting an electrical detonator in the discharge loop of the firing capacitor, and means for connecting an electrical signalling device in the discharge loop of the timing capacitor.

2. Apparatus for firing an electric detonator and simultaneously transmitting an electrical timing impulse comprising a direct current source, a firing capacitor, a timing capacitor, means for connecting said firing capacitor to said source, a resistance network through which said timing capacitor is connected to said source, a normally-open single-pole switch, connections comprising two discharge loops connected to said capacitors and having in common said single-pole switch, rectifier means in at least one of said discharge loops to prevent flow of charging current in said discharge loops, means for connecting an electrical detonator in the discharge loop of the firing capacitor, and means for connecting an electrical signalling device in the discharge loop of the timing capacitor.

3. Apparatus for firing an electric detonator and simultaneously transmitting an electrical timing impulse comprising a direct-current source, a firing capacitor, a timing capacitor, a first resistance network through which said firing capacitor is connected to said source, a second resistance network through which said timing capacitor is connected to said source, the time constant of said timing capacitor with said second network being longer than the time constant of said firing capacitor with said first network, a normally open single-pole switch, connections comprising two discharge loops connected to said capacitors and having in common said single-pole switch, means to prevent charging current from flowing in said discharge loops, means for connecting an electrical detonator in the discharge loop of the firing capacitor, and means for connecting an electrical signalling device in the discharge loop of the timing capacitor.

4. Apparatus for firing an electrtic detonator and simultaneously transmitting an electrical timing impulse comprising a direct-current source, a firing capacitor, a timing capacitor, a resistance network through which said firing capacitor is connected to said source, a resistance network through which said timing capacitor is connected to said source, the resistances in both of said networks having values which are related to the values of said respective capacitors that interconnected junction points are at equal potential during charging of said capacitors, a normally-open single-pole switch, connections comprising two discharge loops connected to said capacitors and having in common said single-pole switch, means for connecting an electrical detonator in the discharge loop of the firing capacitor, and means for connecting an electrical signalling device in the discharge loop of the timing capacitor.

5. Apparatus for firing an electric detonator and simultaneously transmitting an electrical timing impulse comprising a direct-current source, a firing capacitor, a timing capacitor, means for connecting said firing capacitor to said source, a resistance network through which said timing capacitor is connected to said source, a normally-open single-pole switch, connections comprising two discharge loops connected to said capacitors and having in common said single-pole switch, means for connecting an electrical detonator in the discharge loop of the firing capacitor, means to prevent charging current from flowing in the discharge loop of said timing capacitor, means for connecting an electrical signalling device in the discharge loop of the timing capacitor, and resistance means in said timing-capacitor-discharge loop to prolong the discharge time thereof.

6. Apparatus for firing an electric detonator and simultaneously transmitting an electrical timing impulse comprising a direct-current source having first and second terminals, a firing capacitor having its first terminal connected to the first terminal of said source, a timing capacitor having its first terminal connected to the first terminal of said source, a resistor connecting the second terminal of said firing capacitor to the second terminal of said source, a resistor connecting the second terminal of said timing capacitor to the second terminal of said source, a normally-open single-pole switch having a first terminal connected to the first terminal of said source, means for connecting an electrical detonator between the second terminal of said single-pole switch and the second terminal of said firing capacitor, and circuit means for connecting an electrical signalling device between the second terminal of said switch and the second terminal of said timing capacitor, said circuit means including means to prevent charging current from flowing in the signalling-device branch of the circuit.

7. Apparatus for firing an electric detonator and simultaneously transmitting an electrical timing impulse comprising a direct-current source having first and second terminals, a firing capacitor having first and second terminals, means for connecting the first terminal of said firing capacitor to the first terminal of said source, a timing capacitor having first and second terminals, means for connecting the first terminal of said timing capacitor to the first terminal of said source, means for connecting the second terminal of said firing capacitor to the second terminal of said source, means including a resistor for connecting the second terminal of said timing capacitor to the second terminal of said source, said resistor having such value that the timing capacitor with the charging circuit thereof has a longer time constant than said firing capacitor with the charging circuit thereof, a normally-open single-pole switch having a first terminal connected to the first terminal of said source, means for connecting an electrical detonator between the second terminal of said single-pole switch and the second terminal of said firing capacitor, rectifier means, means for connecting an electrical signalling device and said rectifier means in series between the second terminal of said single-pole switch and the second terminal of said timing capacitor, said rectifier means being connected in such direction as to prevent flow of current therethrough during charging of the capacitors but permit flow of current therethrough upon closure of said single-pole switch.

8. Apparatus for firing an electric detonator and simultaneously transmitting an electrical timing impulse comprising a direct-current source having first and second terminals, a firing capacitor having first and second terminals, means for connecting the first terminal of said firing capacitor to the first terminal of said source, a timing capacitor having first and second terminals, means for connecting the first terminal of said timing capacitor to the first terminal of said source, means including a resistor for connecting the second terminal of said firing capacitor to the second terminal of said source, means including a resistor for connecting the second terminal of said timing capacitor to the second terminal of said source, said timing capacitor with the charging circuit thereof having a longer time constant than said firing capacitor with the charging circuit thereof, a normally-open single-pole switch having a first terminal connected to the first terminal of said source, means for connecting an electrical detonator between the second terminal of said single-pole switch and the second terminal of said firing capacitor, rectifier means, means for connecting an electrical signalling device and said rectifier means in series between the second terminal of said single-pole switch and the second terminal of said timing capacitor, said rectifier means being connected in such direction as to prevent flow of current therethrough during charging of the capacitors but permit flow of current therethrough upon closure of said single-pole switch.

9. Apparatus for firing an electric detonator and simultaneously transmitting an electrical timing impulse comprising a direct-current source having first and second terminals, a firing capacitor having first and second terminals, means for connecting the first terminal of said firing capacitor to the first terminal of said source, a timing capacitor having first and second terminals, means for connecting the first terminal of said timing capacitor to the first terminal of said source, means including a resistor for connecting the second terminal of said firing capacitor to the second terminal of said source, means including a resistor for connecting the second terminal of said timing capacitor to the second terminal of said source, each said resistor being of value in the same proportion to the capacitance value of the capacitor to which it is connected, a normally-open single-pole switch having a first terminal connected to the first terminal of said source, means for connecting an electrical detonator between the second terminal of said single-pole switch and the second terminal of said firing capacitor, and means for connecting an electrical signalling device between the second terminal of said single-pole switch and the second terminal of said timing capacitor.

10. Apparatus for firing an electric detonator and simultaneously transmitting an electrical timing impulse comprising a direct-current source having first and second terminals, a firing capacitor having its first terminal connected to the first terminal of said source, a timing capacitor having its first terminal connected to the first terminal of said source, a resistor connecting the second terminal of said firing capacitor to the second terminal of said source, a resistor connecting the second terminal of said timing capacitor to the second terminal of said firing capacitor, a normally-open single-pole switch having a first terminal connected to the first terminal of said source, means for connecting an electrical detonator between the second terminal of said single-pole switch and the second terminal of said firing capacitor, rectifier means, means for connecting an electrical signalling device and said rectifier means in series between the second terminal of said single-pole switch and the second terminal of said timing capacitor, said rectifier means being connected in such direction as to prevent flow of current therethrough during charging of the capacitors but permit flow of current therethrough upon closure of said single-pole switch.

11. Apparatus for firing an electric detonator and simultaneously transmitting an electrical impulse indicative of the instant of detonation comprising a direct-current source, a firing capacitor, a timing capacitor, means for connecting said firing capacitor to said source, means for connecting said timing capacitor to said source, a normally-open single-pole switch, connections comprising two discharge loops respectively including said capacitors and having in common said single-pole firing switch, means to prevent charging current from flowing in the discharge loop of the timing capacitor, means for connecting an electrical detonator requiring a critical firing current in the discharge loop of the firing capacitor, means for connecting an electrical signalling device in the discharge loop of the timing capacitor, and means for closing said single-pole switch when said firing capacitor has built up sufficient voltage to deliver a current to the detonator in excess of the critical current of the detonator.

References Cited in the file of this patent

UNITED STATES PATENTS

| | | |
|---|---|---|
| 1,568,609 | McFarland | Jan. 5, 1926 |
| 2,395,600 | Weisglass | Feb. 26, 1946 |
| 2,470,846 | De Boisblanc | May 24, 1949 |
| 2,553,662 | Marsal | May 22, 1951 |
| 2,623,922 | Muffly | Dec. 30, 1952 |